(12) United States Patent
Becher et al.

(10) Patent No.: US 12,061,127 B2
(45) Date of Patent: Aug. 13, 2024

(54) METHOD FOR PRODUCING A DIFFERENTIAL PRESSURE SENSOR

(71) Applicant: Endress+Hauser SE+Co. KG, Maulburg (DE)

(72) Inventors: Raimund Becher, Ehrenkirchen (DE); Patrick Doria, Berlin (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 266 days.

(21) Appl. No.: 17/756,724

(22) PCT Filed: Nov. 20, 2020

(86) PCT No.: PCT/EP2020/082848
§ 371 (c)(1),
(2) Date: Jun. 1, 2022

(87) PCT Pub. No.: WO2021/110431
PCT Pub. Date: Jun. 10, 2021

(65) Prior Publication Data
US 2023/0012357 A1    Jan. 12, 2023

(30) Foreign Application Priority Data
Dec. 3, 2019  (DE) .......................... 102019132867.5

(51) Int. Cl.
*G01L 13/06*      (2006.01)
*G01L 19/00*      (2006.01)
*G01L 19/06*      (2006.01)

(52) U.S. Cl.
CPC .......... *G01L 19/0627* (2013.01); *G01L 13/06* (2013.01); *G01L 19/0038* (2013.01)

(58) Field of Classification Search
CPC .. G01L 19/0627; G01L 13/06; G01L 19/0038
See application file for complete search history.

(56) References Cited

U.S. PATENT DOCUMENTS 3,563,138  A       2/1971  Symonds et al.
10,126,193 B2 *   11/2018  Sanden ............... G01L 19/0046
(Continued)

FOREIGN PATENT DOCUMENTS

CN         1100198 A      3/1995
CN         1596367 A      3/2005
(Continued)

*Primary Examiner* — Jamel E Williams
(74) *Attorney, Agent, or Firm* — Christopher R. Powers; Endress+Hauser (USA) Holding, Inc.

(57) ABSTRACT

A method for producing a differential pressure sensor includes: a) Providing a sensor assembly; b) Providing a main body with a substantially rotationally symmetrical cavity for receiving the sensor assembly; c) Introducing the sensor assembly into the cavity of the main body; d) Welding the sensor assembly into the cavity of the main body by means of a resistance pulse welding method; e) Introducing, for example, by pressing in, a welding ring between the sensor assembly and the cavity of the main body in an opening region of the cavity; and f) Axial laser welding in the opening region of the cavity such that the main body is welded circumferentially to the sensor assembly by means of the welding ring.

8 Claims, 2 Drawing Sheets

(56) References Cited

U.S. PATENT DOCUMENTS

2017/0205303 A1\* 7/2017 Sanden ............... G01L 19/0046
2017/0334713 A1\* 11/2017 Golden ................ B81B 7/0061

FOREIGN PATENT DOCUMENTS

| CN | 1869599 A | 11/2006 |
|---|---|---|
| CN | 102686992 A | 9/2012 |
| CN | 104048797 A | 9/2014 |
| CN | 204043843 U | 12/2014 |
| CN | 204479229 U | 7/2015 |
| CN | 105953972 A | 9/2016 |
| CN | 107228731 A | 10/2017 |
| CN | 208818407 U | 5/2019 |
| CN | 208902327 A | 5/2019 |
| CN | 209197970 U | 8/2019 |
| CN | 210464778 U | 5/2020 |
| DE | 19608321 A1 | 8/1997 |
| DE | 102018121446 A1 | 3/2020 |
| JP | S5863829 A | 4/1983 |
| JP | H0518838 A | 1/1993 |
| JP | H0850070 A | 2/1996 |

\* cited by examiner

METHOD FOR PRODUCING A DIFFERENTIAL PRESSURE SENSOR

CROSS-REFERENCE TO RELATED APPLICATIONS

The present application is related to and claims the priority benefit of German Patent Application No. 102019132867.5, filed on Dec. 3, 2019, and International Patent Application No. PCT/EP2020/082848, filed Nov. 20, 2020, the entire contents of which are incorporated herein by reference.

TECHNICAL FIELD

BACKGROUND

Differential pressure sensors are used for detecting differential pressures and are used in industrial measurement technology. There they are used for fill-level measurement or flow measurement, for example. For fill-level measurement, for example, the difference between a first pressure at the bottom of a container and a second pressure above the filling material is measured. The difference is proportional to a fill-level-dependent hydrostatic pressure in the container, and thus to the fill level. In the case of flow measurement, for example, a flow resistance is used in a line, and a difference between a first pressure before the resistance and a second pressure after the resistance is measured by means of a differential pressure sensor. This differential pressure is a measure of the flow through the line.

In pressure measurement technology, so-called semiconductor sensors, for example, silicon chips with doped-in resistance elements, are often used as pressure-sensitive elements. Corresponding differential pressure sensors typically comprise a measuring membrane, one side of which is exposed to a first pressure and the other side of which is exposed to a second pressure during measuring operation. The pressures involved create a deflection of the measuring membrane, which corresponds to the differential pressure to be measured. As a rule, pressure sensor chips are very sensitive and are therefore not directly exposed to a medium whose pressure is to be detected. Instead, membrane seals filled with a liquid are installed upstream.

Differential pressure sensors usually have a massive, typically multi-part sensor block as the main body, on which a first separating membrane and a second separating membrane, parallel and opposite to it are arranged externally. The first separating membrane closes off a first pressure reception chamber, which is connected to a first pressure measurement chamber via a pressure transmission line. The second separating membrane correspondingly closes off a second pressure reception chamber, which is connected to a second pressure measurement chamber via a pressure transmission line. The first and the second pressure measurement chambers are separated from each other by the measuring membrane of the differential pressure sensor.

The production of such a differential pressure sensor proves to be relatively difficult and is accordingly also relatively expensive, since it is made from a large number of individual elements or assemblies.

The invention is therefore based on the object of proposing a differential pressure sensor that is simpler and/or cheaper to produce than known differential pressure sensors.

SUMMARY

The object is achieved by the method and the device according to the present disclosure.

The method according to the invention for producing a differential pressure sensor envisages the following method steps:

a) Providing a sensor assembly with a substantially rotationally symmetrical outer contour, wherein the sensor assembly has at least one differential pressure sensor for detecting a differential pressure between a first and a second pressure;

b) Providing a main body with a first and a second separating membrane arranged thereon, on the outer sides of which the first or the second pressure acts during measuring operation, wherein the main body is provided with a substantially rotationally symmetrical cavity for receiving the sensor assembly, wherein an inner contour of the cavity is matched to the outer contour of the sensor assembly, so that the sensor assembly can be inserted into the cavity from the outside;

c) Introducing the sensor assembly into the cavity of the main body, wherein the sensor assembly is inserted with a bearing face into the cavity as far as a stop face of the main body up to a predefined depth;

d) Welding the sensor assembly into the cavity of the main body by means of a resistance pulse welding method in such a way that at least the bearing face of the sensor assembly is welded to the stop face of the main body by a weld seam;

e) Introducing, preferably by pressing in, a welding ring between the sensor assembly and the cavity of the main body in an opening region of the cavity;

f) Axial laser welding in the opening region of the cavity, so that the main body is peripherally welded to the sensor assembly by means of the welding ring.

An advantageous embodiment of the invention provides that the sensor assembly is produced from a glass-metal bushing with a preferably additionally applied ceramic base plate, wherein the differential pressure sensor was applied to the base plate before providing the sensor assembly. In particular, the embodiment can provide that the glass-metal bushing is provided with a circumferential welding collar at one end and the sensor assembly is introduced into the cavity in such a way that the welding collar rests against the opening region of the cavity, so that during axial laser welding the main body with the welding collar is welded circumferentially to the sensor assembly with the aid of the welding ring.

A further embodiment of the invention provides that prior to the provision of the main body the first and/or second separating membrane is welded to the main body, wherein the first separating membrane is welded onto a first outer side of the main body and the second separating membrane is first preferably welded onto a carrier that is subsequently welded onto a second outer side of the main body opposite the first outer side.

In turn, a further embodiment of the invention provides that the sensor assembly has a stepped outer contour formed by the bearing face and having an outer and an inner region, wherein the outer region has a larger diameter than the inner region, and wherein a second radially circumferential cavity has been introduced into the outer region of the sensor assembly, preferably by turning, before the sensor assembly is introduced into the cavity of the main body, so that the radially circumferential cavity serves to decouple the weld seam after the sensor assembly has been welded in.

The invention further relates to a differential pressure sensor produced according to one of the previously described embodiments.

The invention is explained in more detail on the basis of the following drawings. The following is shown:

DETAILED DESCRIPTION

Figure 1:
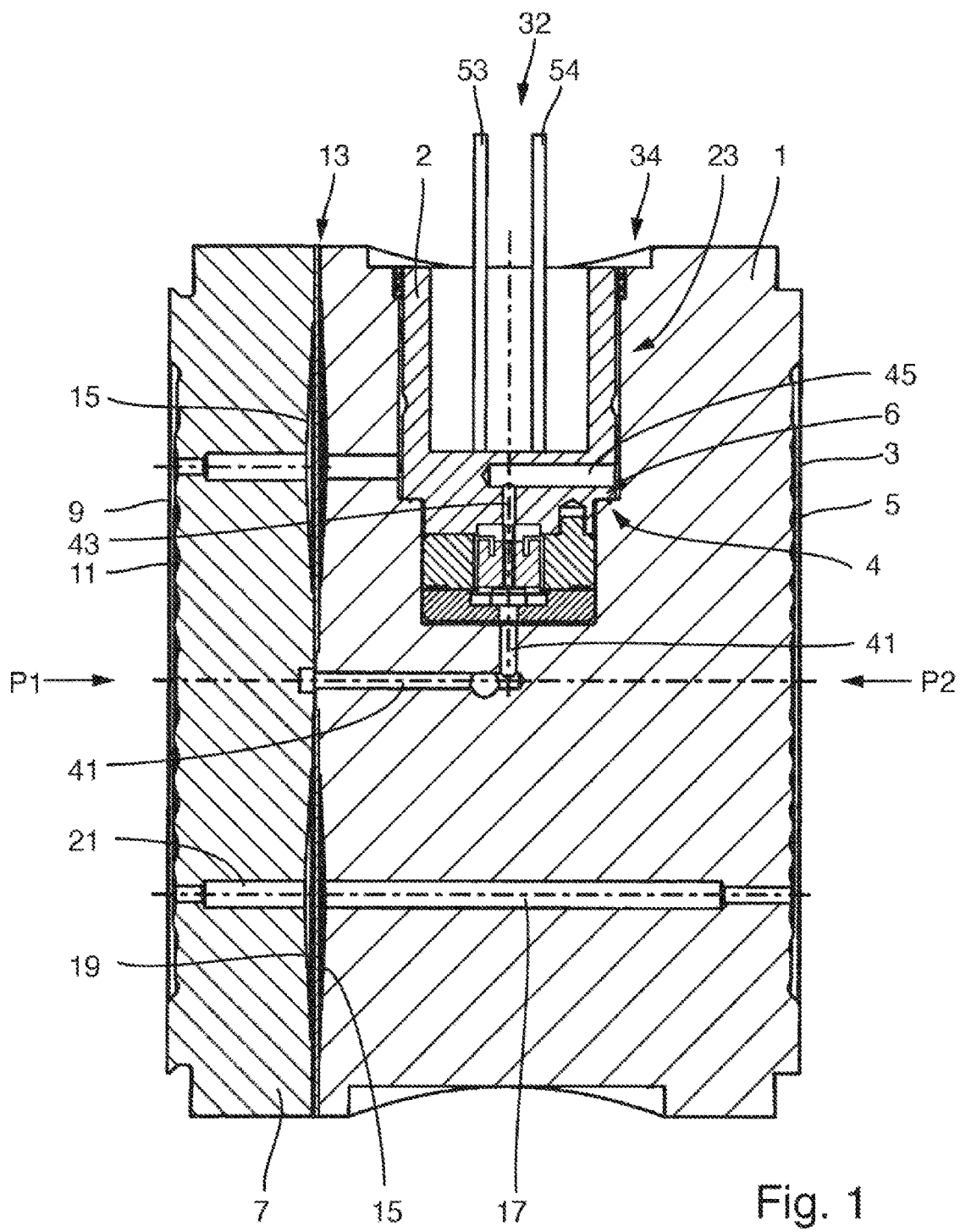
FIG. 1 shows a section through a differential pressure sensor produced according to the invention.

FIG. 1 shows a section through a pressure sensor produced according to the invention. This has a main body 1 on which a first separating membrane 3 is arranged. The main body 1 is a substantially cylindrical solid block, which is preferably made of a metal, in particular a steel or a stainless steel. The separating membrane 3 closes off a first pressure reception chamber 5, which is integrated on the outside into the main body 1.

On the main body 1, a second separating membrane 9 is attached to its outer side opposite the first separating membrane 3. In this case, the second separating membrane 9 can initially have been applied to a substantially disk-shaped carrier 7, which carrier 7 is subsequently welded to the main body. The second separating membrane 9 is arranged on an outer side of the carrier facing away from the main body and that runs parallel to the first separating membrane 3. The second separating membrane 9 closes off a second pressure reception chamber 11, which is integrated in the carrier 7 on the outside. In measuring operation, a second pressure p2, shown in FIG. 1 by an arrow, acts on an outer side, facing away from the carrier 7, of the second separating membrane 9.

The first and second pressures p1, p2 are supplied to the differential pressure sensor, as also in the case of conventional differential pressure sensors, via connections (not shown in FIG. 1). For this purpose, for example, two flanges equipped with corresponding process connections are suitable, which are mounted on the differential pressure sensor in such a way that the respective pressures p1, p2 act on the respective separating membrane 3, 9 via the process connection. The flanges are mounted, for example, by means of bolt screws. The integration of the first pressure reception chamber 5 into the main body 1 has the advantage that this design reduces the influence on measurement accuracy of clamping of the sensor block between the two connections, since fewer tensions between individual components can occur due to the reduction in the number of components.

The differential pressure sensor can optionally have an overload protection, which comprises an annular overload membrane 13 arranged between the main body 1 and the carrier 7. A first side of the overload membrane 13 facing the base body 1 is contiguous to a first overload chamber 15, which is integrated into the main body 1 and is closed off by the overload membrane 13, said chamber being connected to the first pressure reception chamber 5 via a first pressure transmission line 17. The first pressure transmission line 17 is a straight hole leading through the main body 1 from the first pressure reception chamber 5 to the first overload chamber 15. The straight hole offers the advantage that it can be produced very easily, and an optimal transmission of the pressure can be achieved due to the straight line routing. A further advantage is that only very little liquid is required for transmission of the pressure.

In addition, a second side of the overload membrane 13 facing the carrier 7 is contiguous to a second overload chamber 19, which is integrated into the carrier 7 and closed off by the overload membrane 13, said chamber being connected to the first second reception chamber 11 via a second pressure transmission line 21. Here as well, the second pressure transmission line 21 is a straight hole that passes through the carrier 7 and connects the second pressure reception chamber 11 to the second overload chamber 19. The above-mentioned advantages of a straight line routing apply here exactly.

A cavity 23 is provided in the main body 1, into which a sensor assembly can be inserted from the outside. The cavity 23 is designed in such a way that an inner contour of the cavity has at least one step. The stepped cavity 23 can, for example, have been introduced into the main body 1 via two holes with different diameters. By means of the step, a stop face 6 is formed, on which the sensor assembly 2 rests in the introduced state. In addition, a defined depth is specified or defined by the stop face 6 up to which the sensor assembly 2 can be inserted or guided into the cavity 23. The cavity 23 for the sensor assembly 2 preferably opens out in an outer surface of the main body, the plane of which is perpendicular to a plane in which the separating membranes 3, 9 run. In addition, a second step can be provided in the opening region 24, which serves to receive a welding collar which is formed circumferentially at one end of the sensor assembly.

Figure 2:
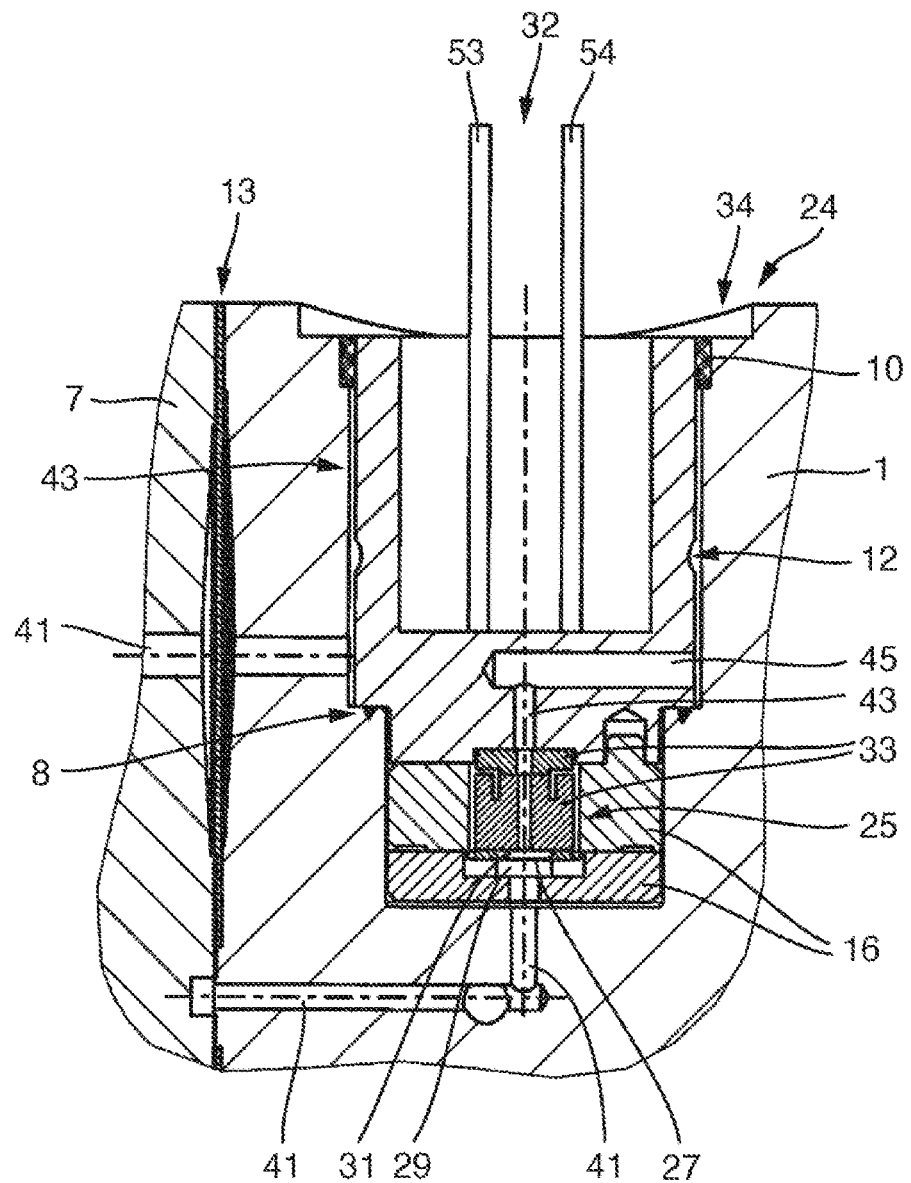
FIG. 2 shows a section through a detail of the differential pressure measuring sensor produced according to the invention.

The sensor assembly 2 is inserted into the cavity 23 during manufacture. In order to be able to introduce the sensor assembly 2 up to the defined depth, the sensor assembly 2 is designed such that it has a substantially rotationally symmetrical, cylindrical outer contour with at least one step corresponding to the step of the cavity 23, so that in the installed state the sensor assembly 2 with a bearing face 4 formed by the step rests on a stop face 6 formed by the step of the cavity 23. In addition, the outer contour of the sensor assembly 2 and the inner contour of the cavity 23 can be matched to one another such that in the installed state a hollow cylindrical gap 14, as shown in FIG. 2, is formed between the outer and inner contours.

The sensor assembly 2 is preferably formed or produced by a glass-metal bushing 32 as a base element. A preferably ceramic base plate 33 for decoupling thermal and/or internal mechanical stresses is applied to the glass-metal bushing 32. A differential pressure sensor 25 for detecting a differential pressure between a first pressure and a second pressure is applied to the base plate 33. The differential pressure sensor 25 is preferably one of the semiconductor sensors described at the outset, for example a silicon-chip differential pressure sensor 25 with a measuring membrane, doped with resistance elements serving as pressure-sensitive elements. The electrical connection of the differential pressure sensor 25 is effected via at least one connecting line 53, 54 which is routed outwards through the glass-metal bushing 32. In addition, a cover 16 is applied to the glass-metal bushing 32 to protect the differential pressure sensor 25. In the differential pressure sensor 25, limited by the measuring membrane, two pressure measuring chambers 29, 31, to which the first or second pressure is supplied, are formed.

A first pressure measurement chamber 29 is connected to the first overload chamber 15 by a third pressure transmission line 41. This consists of a first straight hole running exclusively in the main body 1 and opening in a side wall of the cavity 23, and a second hole which is perpendicular thereto and via which the first pressure measurement chamber 29 is hydraulically connected downstream of the first overload chamber 15.

An interior of the differential pressure sensor that is closed off by the base plate 33 and the measuring membrane 27 forms the second pressure measurement chamber 31, which is separated from the first pressure measurement chamber 29 by the measuring membrane 27. The second pressure measurement chamber 31 is connected via a hole 43 in the sensor assembly 2 to a fourth pressure transmission line 45, via which the second pressure measurement chamber 31 is hydraulically connected downstream to the second overload chamber 19.

In addition, in the installed state the sensor assembly can have a circumferential welding collar at the end facing the opening region of the cavity, which decouples the two weld seams (resistance impulse seam and axial laser weld seam).

In addition, the sensor assembly 2, as shown in FIG. 2, can have a decoupling cavity or groove 12 running circumferentially, which serves for stress decoupling of the weld seam 8 located in the installed and welded state between the stop face and the bearing face 4.

During the manufacture of the differential pressure sensor, the sensor assembly 2 is first introduced into the cavity 23 of the main body 1 in such a way that the sensor assembly rests with the bearing face 4 on the stop surface 6 of the main body. In addition, the sensor assembly 2 is positioned in such a way that the welding collar rests in the opening region of the cavity.

According to the invention, after the sensor assembly has been introduced into the cavity of the main body, the bearing face is first welded to the stop face 6 by means of a resistance pulse welding method, so that a circumferential weld seam 8 is produced.

In the next step, a welding ring 10 is introduced between the sensor assembly and the cavity 23 of the main body 1 in the opening region 24. The sensor assembly 2 is then welded in the opening region 24 to the main body via the welding ring and possibly via the welding collar by means of an axial laser welding method. The axial laser welding method is here carried out/implemented in such a way that an axial seam with a depth greater than 1 mm, preferably greater than 1.5 mm, particularly preferably approximately 2 mm, is produced.

Finally, the differential pressure sensor is filled with the pressure-transmitting liquid.

The invention claimed is:

1. A method for producing a differential pressure sensor, the method comprising:
providing a sensor assembly with a substantially rotationally symmetrical outer contour, the sensor assembly comprising at least one differential pressure sensor configured to detect a differential pressure between a first pressure and a second pressure;
providing a main body including a first separating membrane and a second separating membrane arranged thereon, on exterior sides of which the first pressure or the second pressure acts during measurement operation, wherein the main body further includes a substantially rotationally symmetrical cavity configured to receive the sensor assembly, wherein an inner contour of the cavity is matched to the outer contour of the sensor assembly such that the sensor assembly is insertable into the cavity from the exterior;
introducing the sensor assembly into the cavity of the main body such that a bearing face of the sensor assembly seats against a stop face of the main body at a predefined depth;
welding the sensor assembly into the cavity of the main body by a resistance pulse welding method such that at least the bearing face of the sensor assembly is welded to the stop face of the main body by a weld seam;
introducing a welding ring between the sensor assembly and the cavity of the main body in an opening area of the cavity adjacent the exterior; and
axial laser welding in the opening area of the cavity as to weld the main body circumferentially to the sensor assembly via the welding ring.

2. The method of claim 1, wherein the welding ring is introduced between the sensor assembly and the cavity of the main body by pressing in the welding ring therebetween.

3. The method of claim 1, wherein the sensor assembly is a glass-metal bushing including an applied ceramic base plate, wherein the differential pressure sensor was applied to the base plate before providing of the sensor assembly.

4. The method of claim 3, wherein the glass-metal bushing includes a circumferential welding collar at one end, and the sensor assembly is introduced into the cavity such that the welding collar rests against the opening area of the cavity, and wherein, during the axial laser welding, the main body with the welding collar is welded circumferentially to the sensor assembly with aid of the welding ring.

5. The method of claim 1, wherein prior to providing the main body, the first separating membrane and/or second separating membrane is welded to the main body, wherein the first separating membrane is welded onto a first exterior side of the main body, and the second separating membrane is first welded onto a carrier, which is subsequently welded onto a second exterior side of the main body opposite the first outer side.

6. The method of claim 1, wherein the sensor assembly includes a stepped outer contour, which is defined by the bearing face, and outer and inner regions, wherein the outer region has a larger diameter than the inner region, and wherein a radially circumferential recess is defined in the outer region of the sensor assembly before introducing the sensor assembly into the cavity of the main body such that the recess serves to decouple the weld seam after the welding of the sensor assembly into the cavity of the main body.

7. The method of claim 6, wherein the radially circumferential recess is formed in the outer region of the sensor assembly by a turning operation.

8. A differential pressure sensor manufactured according to the method of claim 1.

* * * * *